United States Patent
Watanabe et al.

(10) Patent No.: US 9,614,195 B2
(45) Date of Patent: Apr. 4, 2017

(54) ENERGY STORAGE DEVICE AND MANUFACTURING METHOD OF THE SAME

(71) Applicant: GS Yuasa International Ltd., Kyoto-shi, Kyoto (JP)

(72) Inventors: Hideto Watanabe, Kyoto (JP); Manabu Kanemoto, Kyoto (JP); Daisuke Okuda, Kyoto (JP); Mitsuhiro Kodama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 29 days.

(21) Appl. No.: 14/673,134

(22) Filed: Mar. 30, 2015

(65) Prior Publication Data
US 2015/0280176 A1 Oct. 1, 2015

(30) Foreign Application Priority Data
Mar. 31, 2014 (JP) .................................. 2014-074282

(51) Int. Cl.
*H01M 2/02* (2006.01)
*H01M 10/04* (2006.01)
*H01M 10/28* (2006.01)
*H01M 10/30* (2006.01)
*H01G 11/78* (2013.01)
*H01G 11/82* (2013.01)

(52) U.S. Cl.
CPC ............ *H01M 2/022* (2013.01); *H01G 11/78* (2013.01); *H01G 11/82* (2013.01); *H01M 2/024* (2013.01); *H01M 10/30* (2013.01); *Y02E 60/13* (2013.01); *Y10T 29/49108* (2015.01)

(58) Field of Classification Search
CPC . Y10T 29/49108; H01M 2/022; H01M 2/024; H01M 10/30; Y02E 60/124; H01G 11/78; H01G 11/82
See application file for complete search history.

(56) References Cited

U.S. PATENT DOCUMENTS

| 5,958,620 A * | 9/1999 | Nagaura ............. H01M 2/0227 429/164 |
| 7,455,930 B2 | 11/2008 | Kasahara |
| 2006/0159989 A1 * | 7/2006 | Bouffard ................ B21D 22/28 429/164 |

FOREIGN PATENT DOCUMENTS

| JP | 4144054 A2 | 5/1992 |
| JP | 7057703 A2 | 3/1995 |
| JP | 7314056 A2 | 12/1995 |
| JP | 9129190 A2 | 5/1997 |
| JP | 10154489 A2 | 6/1998 |
| JP | 10321198 A2 | 12/1998 |
| JP | 11307106 A2 | 11/1999 |
| JP | 2002025603 A2 | 1/2002 |
| JP | 3751765 B2 | 3/2006 |
| JP | 2007066835 A2 | 3/2007 |
| JP | 2007115711 A2 | 5/2007 |
| JP | 2008130429 A2 | 6/2008 |

* cited by examiner

*Primary Examiner* — Brittany Raymond
(74) *Attorney, Agent, or Firm* — Rankin, Hill & Clark LLP

(57) ABSTRACT

An energy storage device including: a cylindrical case having at least one end closed; and an electrode assembly housed in the case. A reduced-diameter portion, at which an outer diameter of the case is reduced, is formed at the closed end of the case.

5 Claims, 5 Drawing Sheets

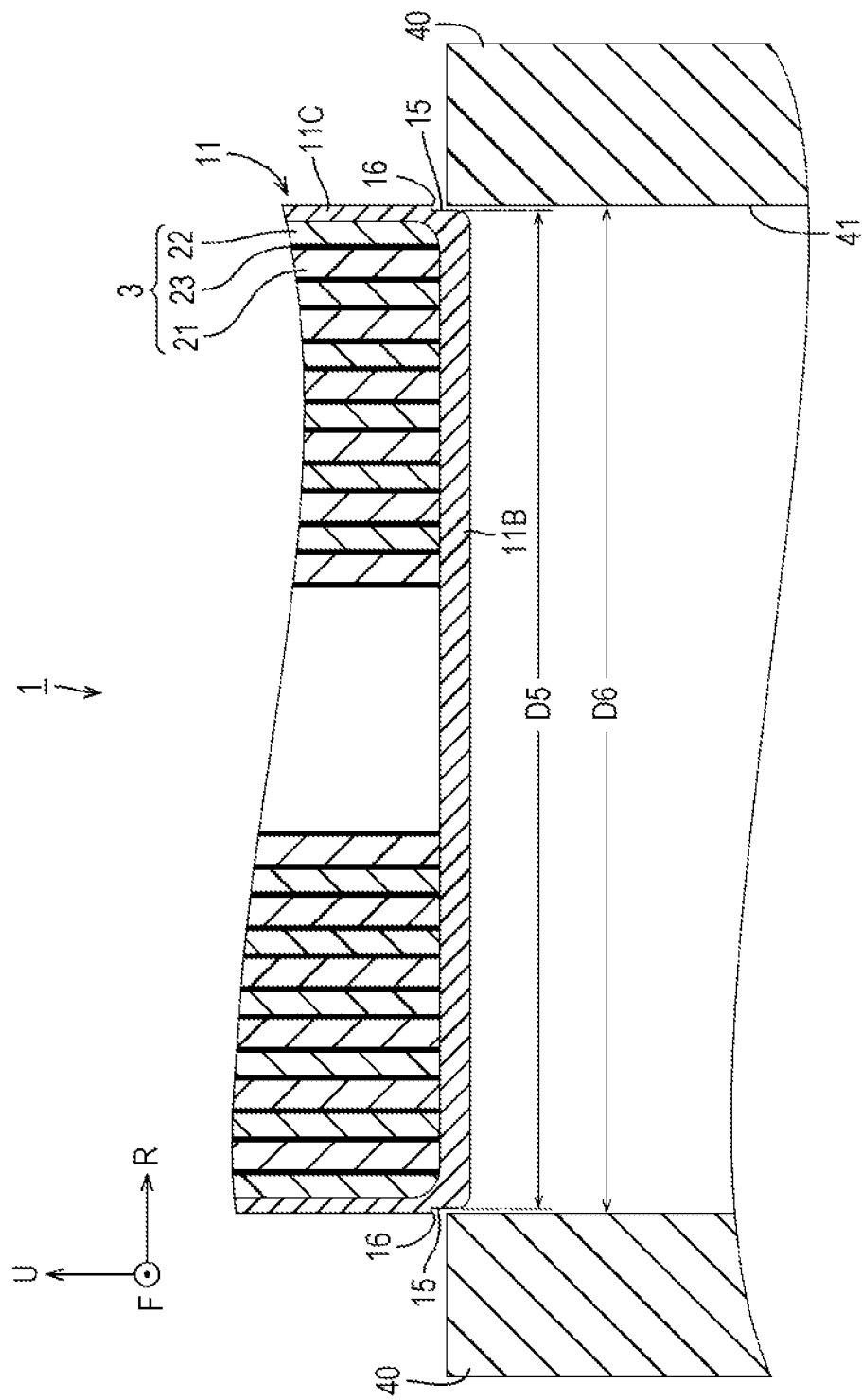

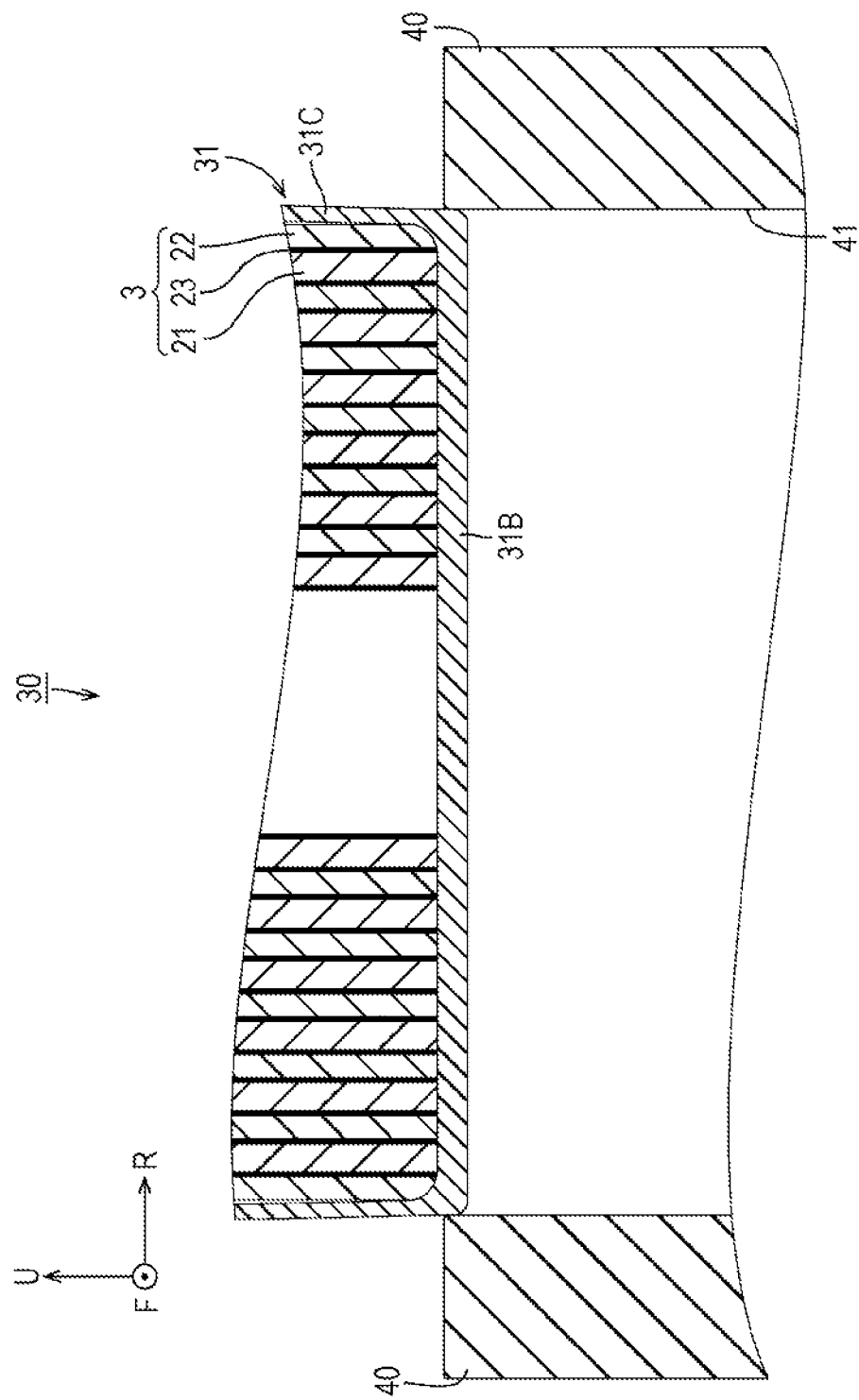

ENERGY STORAGE DEVICE AND MANUFACTURING METHOD OF THE SAME

CROSS-REFERENCE TO RELATED APPLICATIONS

This application claims the benefit of Japanese patent application No. 2014-074282, filed on Mar. 31, 2014, which is incorporated by reference.

FIELD

The present invention relates to the structure of a case for an energy storage device.

BACKGROUND

An electrode assembly is housed within a cylindrical case body having an opening at one end thereof and a closed end at the other end thereof. The open portion of the case body is sealed with a cover to form a case for a battery, and thereafter, the case for the battery is press-fitted to, for example, an annular jig, followed by a diameter reducing process, thus manufacturing a battery such as an alkaline secondary battery (see JP-A-2002-25603). With such a process, a battery having a high capacity can be fabricated.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The conventional case body for a battery has the same outer diameter over the entire length in the axial direction thereof. Furthermore, the closed portion of the case body has higher rigidity than a side wall portion, and therefore, the closed portion is less likely to be reduced in diameter. In the above-described diameter reducing process, an external force applied onto the closed portion of the case body is transmitted to the side wall portion, and thus, the closed portion expands outward or the case body may be deformed.

An object of the present invention is to provide a technique capable of suppressing deformation of a case body for an energy storage device in a diameter reducing process.

An energy storage device according to an aspect of the present invention includes: a cylindrical case having at least one end closed; and an electrode assembly housed in the case, wherein a reduced-diameter portion, at which an outer diameter of the case is reduced, is formed at the closed end of the case.

BRIEF DESCRIPTION OF THE DRAWINGS

The foregoing and other features of the present invention will become apparent from the following description and drawings of an illustrative embodiment of the invention in which:

FIG. 4 is a view schematically showing the state of the battery case in a diameter reducing process; and FIG. 5 is a view schematically showing the state of a comparative battery case in a diameter reducing process.

DESCRIPTION OF EMBODIMENTS

Figure 1:
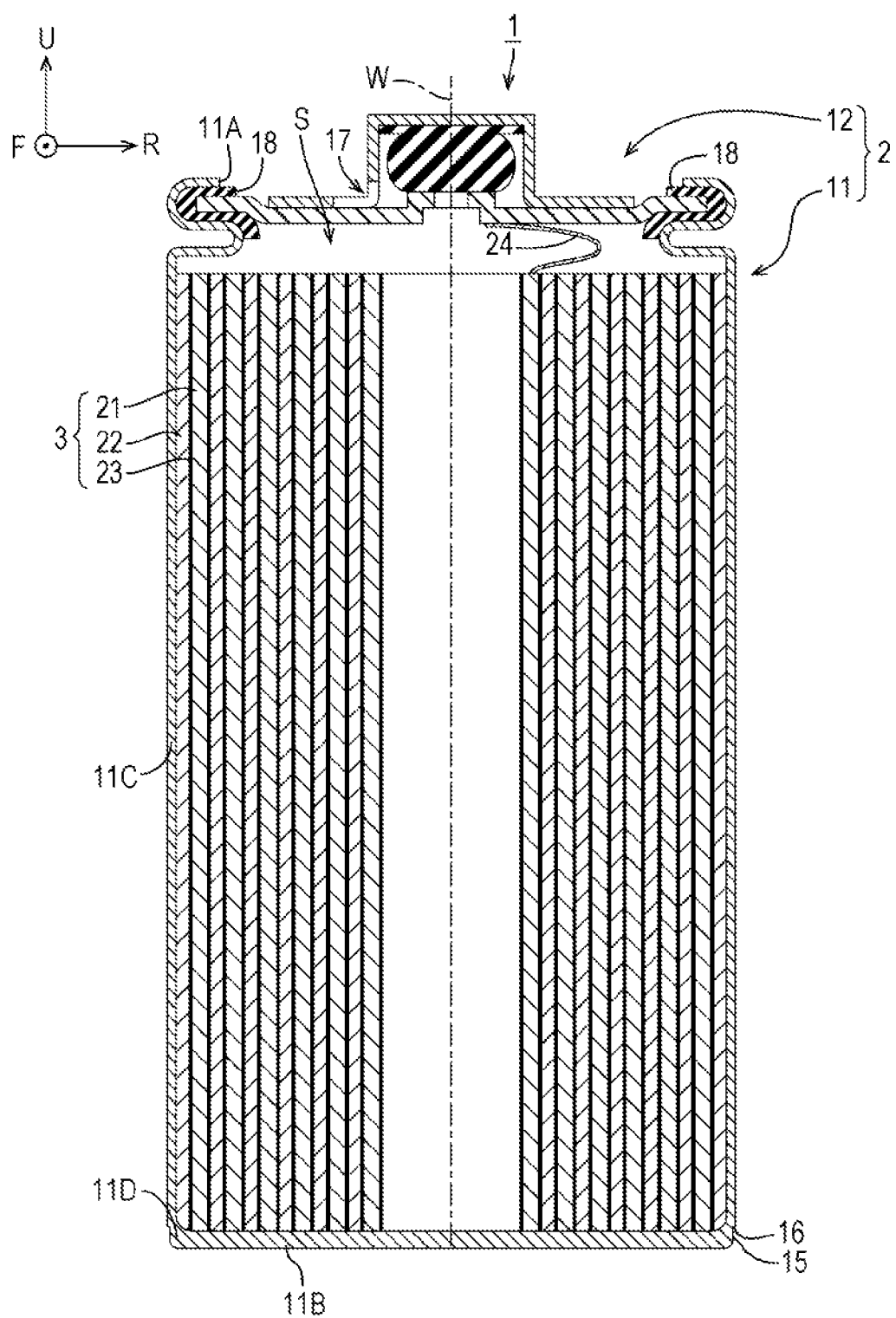
FIG. 1 is a vertical cross-sectional view showing an exemplary battery.

An energy storage device disclosed in the present specification includes a cylindrical case having at least one end closed and an electrode assembly housed in the case, wherein a reduced-diameter portion, at which an outer diameter of the case is reduced, is formed at the closed end of the case. With this energy storage device, it is possible to suppress deformation of a case body for the energy storage device in a diameter reducing process in comparison with a configuration in which no reduced-diameter portion is formed at a case.

In the above-described energy storage device, a dimension of the reduced-diameter portion in an axial direction of the case may be equal to or more than a thickness of a portion forming the closed end. With this energy storage device, the deformation of the case body can be more securely suppressed in comparison with a configuration in which the dimension of a reduced-diameter portion is less than the thickness of a closed portion of a case.

In the above-described energy storage device, a stem may be formed between an outer surface of the case and the reduced-diameter portion. With the energy storage device, it is possible to more securely suppress a pressing force applied onto the closed portion caused by diameter reduction in comparison with a configuration without any step.

In the above-described energy storage device, the case body may have a thick portion whose wall thickness increases toward the closed end. The step may be formed at an outer surface of the thick portion. With the energy storage device, it is possible to suppress a decrease in strength because of the thinness of the case body caused by the formation of the reduced-diameter portion in comparison with a configuration in which a step is formed at a position nearer an opening than a thick portion.

A manufacturing method of an energy storage device provided with a cylindrical case having at least one end closed may include: forming a reduced-diameter portion, at which an outer diameter of the case is reduced, at the closed end of the case; and reducing the outer diameter of the case housing an electrode assembly therein.

According to a first aspect of the invention, it is possible to suppress the deformation of the case body for the energy storage device in the diameter reducing process.

A battery 1 according to an embodiment will be explained with reference to FIGS. 1 to 5. The battery 1 exemplifies an energy storage device, that is, an alkali secondary battery such as a nickel-metal hydride rechargeable battery. In the description below, the near side in a direction perpendicular to the sheet of FIG. 1 is designated by reference character F; the right side of the battery 1 on the sheet, by R; and the upper side of the battery 1 on the sheet, by U.

As shown in FIG. 1, the battery 1 is provided with a battery case 2 and an electrode assembly 3. The battery case 2 is made of, for example, metal, and is formed into a cylindrical shape long in one direction, i.e., in a vertical direction in FIG. 1. The battery case 2 has a case body 11 and a cover 12, and further, has a container space S therein. The battery case 2 exemplifies a case.

The case body 11 is plated with nickel. A negative plate 22, described later, is electrically connected so that the case body 11 functions as a negative terminal of the battery 1. The case body 11 is formed into a cylindrical shape, in which there is an opening at one end in the longitudinal direction of the battery case 2 whereas a closed end at the other end. Hereinafter, the longitudinal direction, that is, the center axial direction of the case body 11 may be simply referred to as an axial direction W. The case body 11 is integrally molded by drawing, for example, a piece of metallic plate. The case body 11 has an open portion 11A, a closed portion 11B, and a side wall portion 11C.

The open portion 11A is circularly open at the upper end of the case body 11. The closed portion 11B is formed into a disk-like shape, and forms the bottom of the case body 11, that is, the lower portion in FIG. 1. The side wall portion 11C is formed into a cylindrical shape, and forms the side wall of the case body 11 along the axial direction W. The drawing process makes the closed portion 11B thicker than the side wall portion 11C in the case body 11. Hereinafter, the thickness of the closed portion 11B is designated by D1; and the thickness of the side wall portion 11C, by D2 (<D1) (see FIG. 2).

Figure 2:
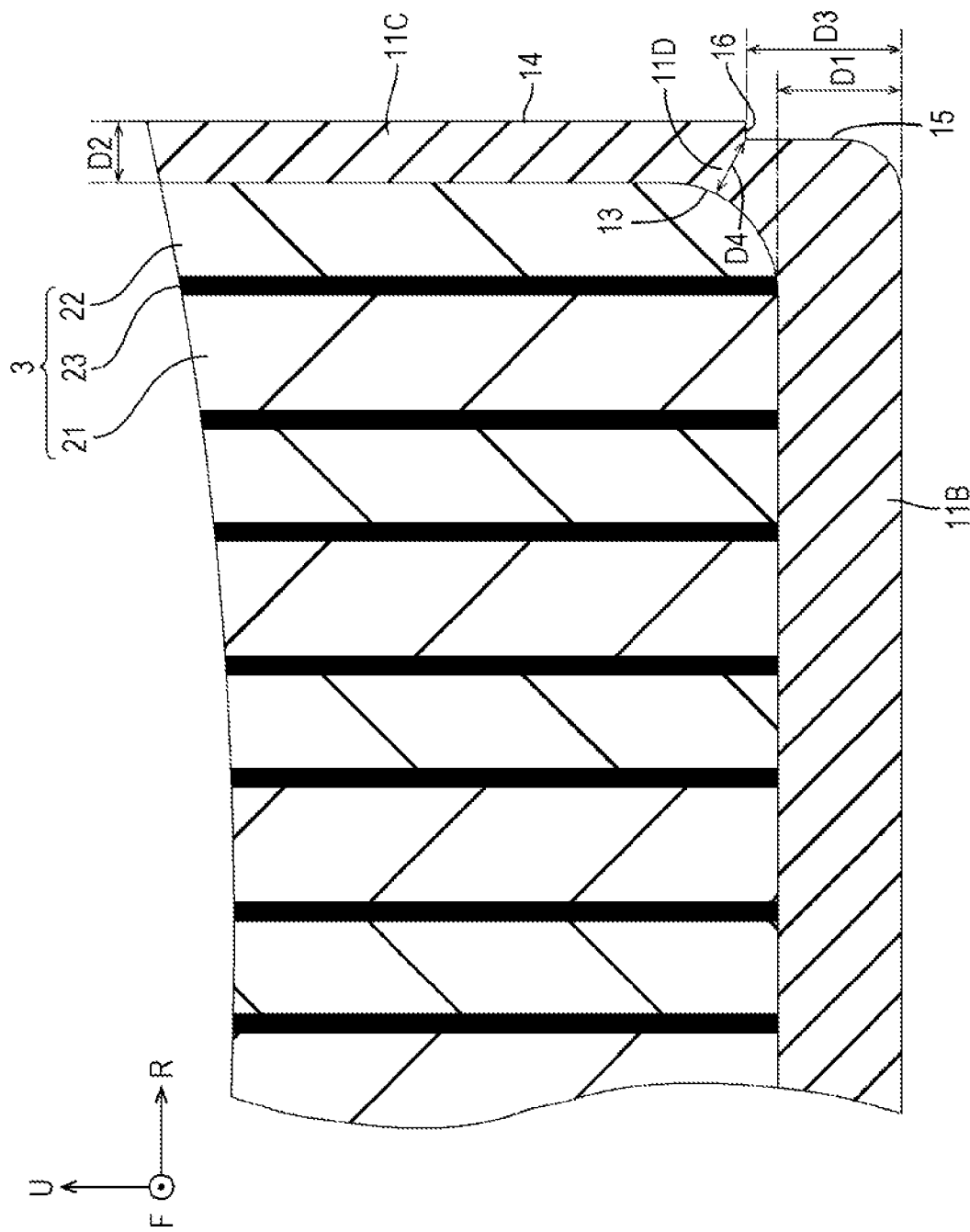
FIG. 2 is an enlarged cross-sectional view showing the bottom of a battery case.

As shown in FIG. 2, the case body 11 becomes thicker from the side wall portion 11C toward the closed portion 11B at a boundary portion 11D between the closed portion 11B and the side wall portion 11C. More specifically, the boundary portion 11D is formed such that an inner surface 13 of the case body 11 is curved extends away from an outer surface 14 from the side wall portion 11C toward the closed portion 11B. The boundary portion 11D exemplifies a thickness change portion.

A reduced-diameter portion 15 is formed at the outer surface 14 on the side of the closed portion 11B in the case body 11. The reduced-diameter portion 15 has a small outer diameter with respect to the outer surface 14 at the center of the case body 11 in the axial direction W, and further, is connected to the outer surface 14 via a step 16. A dimension D3 of the reduced-diameter portion 15 in the axial direction W is more than the thickness D1 of the closed portion 11B. In this manner, it is possible to more securely suppress the deformation of the case body 11 in comparison with the case where the dimension of the reduced-diameter portion 15 is less than the thickness D1 of the closed portion 11B.

The step 16 is formed at the outer surface 14 of the boundary portion 11D. In other words, the step 16 is formed at a portion thicker than the side wall portion 11C. As a consequence, the entire reduced-diameter portion 15 is formed at the portion thicker than the side wall portion 11C. Thus, it is possible to suppress the thinness of the case body 11 caused by the formation of the reduced-diameter portion 15 so as to prevent a decrease in strength in comparison with a configuration in which the step 16 is formed nearer the open portion 11A than the boundary portion 11D. Incidentally, in the case body 11, a thickness D4 of a portion at which the step 16 is formed is more than the thickness D2 of the side wall portion 11C.

Figure 3:
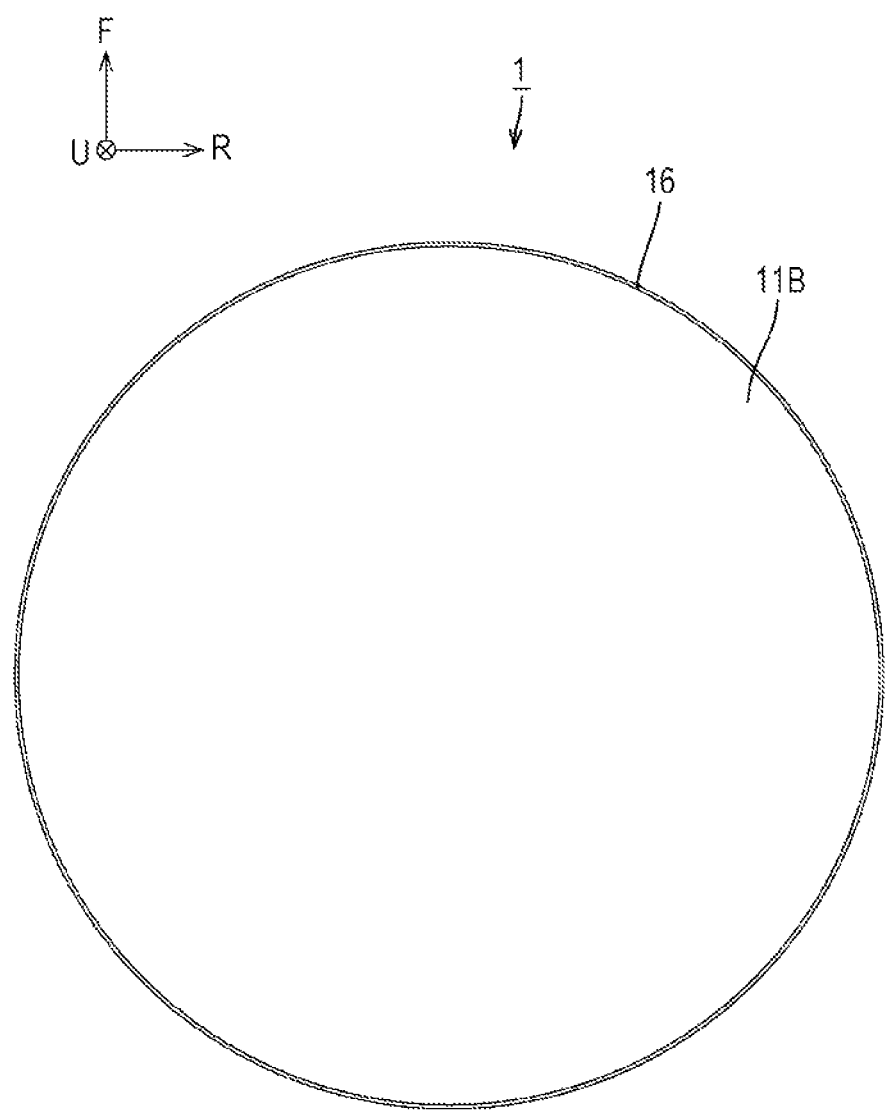
FIG. 3 is a bottom view showing the battery case.

Furthermore, as shown in FIG. 3, the reduced-diameter portion 15 is formed over the entire circumference of the case body 11. Consequently, it is possible to more securely suppress the deformation of the case body 11 in comparison with the case where the reduced-diameter portion 15 is partly formed over the circumference of the case body 11. Incidentally the reduced-diameter portion 15 extends up to the closed end of the case body 11. The portion of the closed end, that is, the lower portion in the drawings is Chamfered in an arcuate manner. In addition, the dimension D3 of the reduced-diameter portion 15 is the same over the entire circumference of the case body 11.

The cover 12 is electrically connected to a positive plate 21, described later, via a connecting terminal 24 having elasticity, and functions as a positive terminal for the battery 1. The cover 12 is formed into a disk-like shape as a whole, and closes the open portion 11A of the case body 11. Specifically, the peripheral edge of the cover 12 is fitted to a tip portion on the side of the open portion 11A of the case body 11 via an insulating gasket 18 made of a resin or the like. The tip portion is crimped. In this manner, the insulation between the cover 12 and the case body 11 is kept while the case body 11 is sealed. A safety valve 17 is disposed at the cover 12, and therefore, it can exhaust gas staying inside of the battery case 2 to the outside when the inner pressure of the battery case 2 becomes a predetermined value or higher.

The electrode assembly 3 is contained in the container space S of the battery case 2. The electrode assembly 3 is configured by spirally winding the positive plate 21, the negative plate 22, and an electrolyte containing separator 23 held between the plates 21 and 22 around a winding axis in the axial direction W of the case body 11.

Incidentally, the positive plate 21 is formed by applying a positive electrode active material such as a mixture of a positive electrode nickel hydride active material and a conductive cobalt compound to a positive metal plate such as foamable nickel. The negative plate 22 is formed by applying a negative electrode active material such as cadmium powder or hydrogen occlusion alloy powder to a negative metal plate such as a flat porous steel plate plated with nickel. The separator 23 is made of, for example, a polyolefin non-woven fabric. An electrolytic solution including mainly potassium hydroxide or sodium hydroxide is impregnated in the separator 23.

FIGS. 4 and 5 show the states of the case body 11 and a case body 31 in a diameter reducing process in the above-described battery 1 and a battery 30 in a comparative example, respectively. In the diameter reducing process, the batteries 1 and 30 are press-fitted into a hole 41 formed at a diameter reducing die 40 from the side of the cover 12, and are allowed to pass therethrough, thus reducing the diameters of the case bodies 11 and 31 in a standard width of a battery.

As shown in FIG. 5, no reduced-diameter portion is formed at the case body 31 of the battery 30. Therefore, a closed portion 31B of the case body 31 receives a pressing force from the die 40. However, the closed portion 31B is formed into a plate-like shape parallel in the direction of the pressing force. In contrast, a side wall portion 31C has an annular cavity therein. As a consequence, the closed portion 31B is strong, and therefore, is hardly deformed in comparison with the side wall portion 31C. Thus, the pressing force from the die 40 is transmitted from the closed portion 31B to the side wall portion 31C, thereby making the closed portion 31C expand outward, that is, possibly deforming the case body 31.

In contrast, as shown in FIG. 4, the reduced-diameter portion 15 is formed at the case body 11 of the battery 1. As a consequence, the closed portion 11B of the case body 11 hardly receives the pressing force from the die 40. Therefore, it is possible to suppress the deformation of the case body 11 caused by the diameter reducing process in comparison with the battery 30. As shown in FIG. 4, if an outer diameter D5 of a portion at which the reduced-diameter portion 15 is formed is set to be smaller than an outer diameter D6 of the hole 41 of the die 40, that is, a standard outer diameter of a battery, the closed portion 11B does not receive the pressing force from the die 40, and therefore, it is possible to more securely suppress the deformation of the case body 11.

The technique disclosed in the present specification is not limited to the descriptions or the embodiment explained with reference to the attached drawings, and therefore, includes the following various modes, for example.

The "energy storage device" is not limited to the alkali battery, and therefore, may be a manganese battery, a secondary battery, and a capacitor. Moreover, the "case" is not limited to a cylindrical shape, and therefore, may be a square cylindrical shape. In addition, the case may have the thickness of the closed portion that is equal to or less than that of the side wall portion.

The reduced-diameter portion may be formed at an outer peripheral end at a portion closed with the cover 12 such as an outer surface at the upper end of the side wall portion 11C or an outer surface of the open portion 11A in the case body 11. With this configuration, it is possible to suppress the deformation of a portion closed with the cover 12 in the case, body 11 of the battery 1 in the diameter reducing process.

The case body 11 may have a configuration such that the step 16 is formed at a position nearer the open portion 11A than the boundary portion 11D, for example, at the side wall portion 11C. Furthermore, the case body 11 may have the dimension of the reduced-diameter portion 15 that is less than the thickness D1 of the closed portion 11B. Moreover, the case body 11 may have a configuration such that the reduced-diameter portion 15 is partly formed over the entire circumference thereof. In addition, the case body 11 may be formed into a shape whose outer diameter becomes smaller toward the closed end without any step.

The step 16 may not be formed at the surface substantially perpendicularly in the axial direction W, and therefore, may be slantwise inclined from the outer surface 14 of the case body 11 toward the reduced-diameter portion 15.

What is claimed is:
1. An energy storage device comprising:
  a cylindrical case having at least one end closed; and
  an electrode assembly housed in the case,
  wherein a reduced-diameter portion, at which an outer diameter of the case is reduced, is formed at the closed end of the case,
  a step is formed between an outer surface of the case and the reduced-diameter portion, and
  a thickness of a portion at which the step is formed is more than a thickness of a side wall portion of the case.
2. The energy storage device according to claim 1, wherein a dimension of the reduced-diameter portion in an axial direction of the case is equal to or more than a thickness of a portion forming the closed end.
3. The energy storage device according to claim 2, wherein the case comprises a thick portion whose wall thickness increases toward the closed end, and
  the step is formed at an outer surface of the thick portion.
4. The energy storage device according to claim 1, wherein the case comprises a thick portion whose wall thickness increases toward the closed end, and
  the step is formed at an outer surface of the thick portion.
5. A manufacturing method of an energy storage device provided with a cylindrical case having at least one end closed, the manufacturing method comprising:
  forming a reduced-diameter portion, at which an outer diameter of the case is reduced, at the closed end of the case;
  forming a step between an outer surface of the case and the reduced-diameter portion; and
  reducing the outer diameter of the case having the reduced-diameter portion formed thereat and housing an electrode assembly therein,
  wherein a thickness of a portion at which the step is formed is more than a thickness of a side wall portion of the case.

\* \* \* \* \*